United States Patent [19]

Ichikawa et al.

[11] Patent Number: 4,506,134
[45] Date of Patent: Mar. 19, 1985

[54] FLASH BUTT WELDING METHOD

[75] Inventors: Masashi Ichikawa; Toru Saito; Takeshi Nishi, all of Sagamihara, Japan

[73] Assignee: Nippon Steel Corporation, Tokyo, Japan

[21] Appl. No.: 577,782

[22] Filed: Feb. 7, 1984

[30] Foreign Application Priority Data

Feb. 10, 1983 [JP] Japan ................... 58-19642

[51] Int. Cl.³ .............................................. B23K 11/04
[52] U.S. Cl. .................................... 219/100; 219/104
[58] Field of Search ................. 219/100, 97, 104, 101

[56] References Cited

U.S. PATENT DOCUMENTS 3,435,182 3/1969 Rietsch ................................ 219/100
4,164,638 8/1979 Ulmer ................................. 219/100

Primary Examiner—Roy N. Envall, Jr.
Assistant Examiner—C. M. Sigda
Attorney, Agent, or Firm—Wenderoth, Lind & Ponack

[57] ABSTRACT

A joint is made between two pieces of steel which have been preheated to a temperature To (°C.) near their abutting surfaces by subjecting first to flashing and then to upsetting. When the ultimate flashing rate is V (mm/sec.), a current whose density I (A/mm²) is not lower than $$120 \sqrt{\frac{1500 - T_o}{1500}} V$$

is passed during the upsetting process to melt the abutting surfaces. With a mean upsetting rate of not lower than 50 mm/sec., only the molten metal is rapidly squeezed out from the abutting surfaces. Then, the upset current is cut off while applying a final upsetting force that is as low as under 5 kg/mm².

1 Claim, 6 Drawing Figures

FLASH BUTT WELDING METHOD

BACKGROUND OF THE INVENTION

This invention relates to a method of flash butt welding, and more particularly to a flash butt welding method for steel products that provides high-quality welds whose toughness does not deteriorate as much as that result from known methods.

As shown in FIG. 1, flash butt welding consists of a preheating step (which may be omitted sometimes), flashing process, and upsetting process that are carried out in that order. In the flashing process, the end surfaces of two pieces of metal that are to be joined together are brought into light contact with each other. By passing a large amount of current therethrough, heat is generated concentratedly at the point where two abutting surfaces contact. Under the effect of this heat, the metal at the contact point melts and splashes. By further advancing the workpieces, as shown in FIG. 1, the entirety of the end surfaces are heated while repeating melting and splashing. In the following upsetting process, the platen is quickly moved forward to cause the end surfaces to stick fast to each other in the whole area thereof, then a joint is made by distorting the weld under pressure for a given period of time.

Generally, the weld including the abutting surfaces and heat-affected zone made by this flash butt welding method does not exhibit good toughness. Particularly the welding interface hardly shows an impact value equivalent to that of the base metal in the impact test. Since this low impact value cannot be raised to the level of the base metal by any heat treatment, a solution for this problem has been long awaited. Although this drop in impact value and toughness has been attributed to various causes, no definite conclusion has yet been reached. The causes so far conceived include: (i) Dent that is made in either or both end surfaces that are brought into contact for flashing, and remains as it is even after welding has been completed; (ii) Molten metal and fine inclusions contained therein resulting from flashing and remaining unremoved during the following upsetting process; and (iii) Distortion of metal flow due to pressure welding.

Conventional flash butt welding methods usually pass a current of 30 to 100 A/mm² in terms of current density for a period not longer than approximately 300 msec. for upsetting, and applies an upsetting pressure of approximately 5 to 10 kg/mm² or a greater pressure until an appropriate amount of upset loss length of approximately 3 to 15 mm is attained. The upset current applied melts part of the metal at the end surfaces and softens the base metal near the end surfaces that is heated to high temperatures. The pressure applied causes the two abutting surfaces to stick fast to each other that are softened by the heat generated by the upset current. It is considered that part of the molten metal is squeezed out and inclusions such as oxides in the end surfaces are finely divided and scattered under such conditions. Joining together the end surfaces with such a strong upsetting force as to eliminate the surface irregularities unavoidably induces the distortion of metal flow and deterioration of toughness. The temperature at the abutting surfaces drops rapidly because the current value is low, and the softened heat-affected zone is pushed out to form a metal flow by the force applied that exceeds the compression strength of the steel at high temperatures.

FIG. 2 is an enlarged representation of the upsetting process in FIG. 1, in which the relationship between the displacement of the platen after the start of upsetting in flash butt welding and the time during which upset current is passed. The curve (A) is obtained when steel of the composition shown in Table 1 is welded under the conditions shown in Table 2. As is shown by the curve (A) that is plotted by connecting points ①→②→⑨, the platen speed grows slower with time in the upsetting process according to the conventional methods. A sketch (A) in FIG. 3 schematically illustrates a cross-section showing the metal flow resulted under the same welding conditions. If the upsetting force is lowered to suppress the development of metal flow, the end-surface irregularities will not be totally pressed flat, with the result that no perfect coalescence is produced throughout the entire area of welding interface, the quantity of residual oxides and other inclusions increases, and, consequently, the joint formed is of unsatisfactory quality.

TABLE 1

| Chemical Composition of Specimen (percent by weight) | | | | | | | | |
|---|---|---|---|---|---|---|---|---|
| C | Si | Mn | P | S | Cr | Al | Ti | V |
| 0.07 | 0.23 | 1.9 | 0.015 | 0.008 | 1.8 | 0.04 | 0.02 | 0.06 |

TABLE 2

| Welding Conditions | |
|---|---|
| Total flash loss | 15 mm |
| Flashing time | 24 sec. |
| Ultimate flashing rate V | 1.25 mm/sec. |
| Upset current density | 40 Arms/mm² |
| Upsetting force | 7.5 kg/mm² |

SUMMARY OF THE INVENTION

The object of this invention is to provide a flash butt welding method that provides solutions to the aforementioned problems, achieves a remarkable improvement in toughness, and produces welds of high quality.

According to the flash butt welding method of this invention, a joint is formed by subjecting metal pieces, which have been preheated to a temperature To (°C.) before the start of flashing, to flashing and then to upsetting. When the ultimate flashing rate is V (mm/sec.), an upset current with a current density I (A/mm²) is passed, I being not lower than $$120 \sqrt{\frac{1500 - T_o}{1500}} \, V \, .$$

While melting the abutting surfaces of the metal pieces, the mean upsetting speed is kept at 50 mm/sec. or above. The ultimate upsetting is accomplished with a pressure of under 5 kg/mm² immediately before cutting off the upset current. That is, the flash butt welding method of this invention is characterized by the upsetting process that is achieved by passing a larger upset current, at a higher speed and with a lower pressure, as compared with the conventional methods.

In the upsetting process of this invention, the abutting surfaces are melted and the resulting molten metal is progressively and rapidly squeezed out. This assures that smooth abutting surfaces are obtained and oxides and other inclusions are eliminated. After the upset current is cut off, no molten metal remains and solidifies in the weld.

Since upsetting is performed with a low pressure, no metal flow distortion occurs. The clean and smooth abutting surfaces assures an intimate contact throughout the entire area of the abutting surfaces even though they are brought together at a low pressure.

The result of all this is a welded joint having a high degree of toughness.

DETAILED DESCRIPTION OF THE PREFERRED EMBODIMENTS

Figure 1:
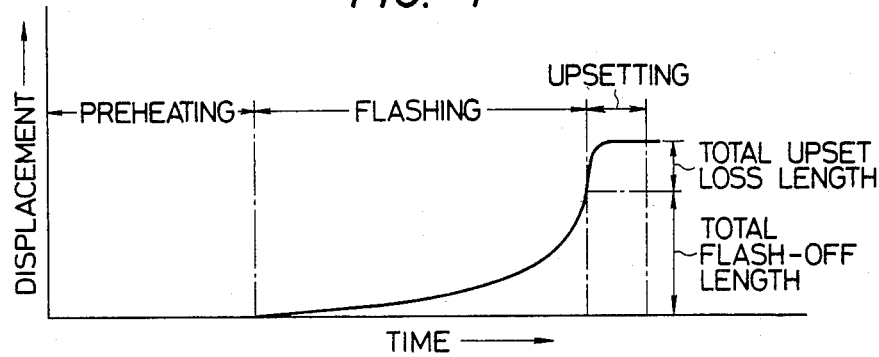
FIG. 1 is a diagram illustrating the processes making up an ordinary flash butt welding method.

The flash butt welding method of this invention performs upsetting while melting the entire area of abutting surfaces passing an upset current of high current density. The current density as used here means the amount of current passed per unit area of the abutting surfaces of metal pieces to be joined together. The current density that is needed to achieve upsetting while melting the entire area of abutting surfaces is, as it should be, affected by the temperature gradient in the metal pieces to be welded immediately before or just when upsetting is started. The temperature gradient immediately before upsetting is one that exists in the direction perpendicular to the abutting surfaces which is affected by various flashing conditions. Therefore, the entire area of upset abutting surfaces can be melted by passing as much current as is enough to overcome the heat diffusion therefrom due to the temperature gradient that exists when upsetting begins. Experimentally, it was determined that the current density needed for keeping the entire area of abutting surfaces molten has the following relationship with the preheating temperature To (°C.) near the end surfaces of the metal pieces to be welded, and the ultimate flashing rate V (mm/sec.), the platen speed in the flashing process immediately before upsetting. The ultimate flashing rate as used here means the total amount of the loss of the two welded metal pieces that is burnt off in a given unit time by flashing immediately before upsetting. Namely, it became known that the abutting surfaces can be kept molten by passing a current whose current density I equals $$120 \sqrt{\frac{1500 - T_o}{1500}} V$$

(Arms/mm$^2$). The current density I is an effective value. The above relationship $$I = 120 \sqrt{\frac{1500 - T_o}{1500}} V$$

among the current density I (Arms/mm$^2$), preheating temperature To (°C.) near the abutting surfaces before flashing, and ultimate flashing rate V (mm/sec.) was derived as follows: As mentioned previously, the entire area of abutting surfaces can be kept molten by providing as much heat input as is equivalent to the amount of a temperature drop therein that results from the heat diffusion due to the temperature gradient that exists when upsetting beings.

The temperature drop rate $\partial T/\partial t$ (t=time) is expressed as $$\partial T/\partial t \propto -V(T_m - T_o) \quad (1)$$

If no upset current is passed, the rate of the temperature drop induced by the heat diffusion immediately after upsetting, as is determined from equation (1), is proportional to the ultimate flashing rate and the temperature difference $(T_m - T_o)$ between the melting point of the material being welded and the actual temperature of the base metal.

When upset current is passed through the abutting surfaces, the temperature drop rate then is expressed as $$\partial T/\partial t = k \partial^2 T/\partial x^2 + P/c\pi \quad (2)$$

where x is a coordinate in the direction that is perpendicular to abutting surfaces, k a coefficient of heat diffusion, P the amount of heat applied per unit time and volume on the weld by the upset current, $\pi$ the density of the material being welded, and c the specific heat of the same material.

Conceivably, the abutting surfaces are kept molten if the heat-diffusion-induced temperature drop rate as determined by equation (1) is equal to the amount of heat generated by the upset current at the abutting surfaces, i.e., $\partial^2 T/\partial x^2 = 0$. From equations (1) and (2), therefore, $$P = I^2 R \propto V(T_m - T_o) \quad (3)$$

where I is the current density of upset current and R is the resistivity at abutting surfaces.

By keeping R and Tm constant and introducing a constant of proportionality A, the following equation is derived from equation (3):

$$I = A \sqrt{\frac{T_m - T_o}{T_m}} V \quad (4)$$

By substituting an approximate value of 1500 for Tm and an experimentally derived value of 120 for the constant of proportionality A, equation (4) is rearranged as $$I = 120 \sqrt{\frac{1500 - T_o}{1500}} V \quad (5)$$

This means that the abutting surfaces can be kept molten during the upsetting process by passing a current whose density I (Amrs/mm²) is not lower than $$120\sqrt{\frac{1500 - T_o}{1500}} V .$$

The temperature at which the abutting surfaces must be kept during upsetting need not be higher than the melting point of the steel being welded. Heating to a temperature range in which the abutting surfaces become fluid enough to be easily pushed out by the displacement of the platen that takes place in the upsetting process is sufficient.

When the current satisfying said current density requirement is passed, the speed at which the metal is molten changes with the current density. Increasing the current density causes the metal to be melted faster. By pressing the platen at a speed equal to or higher than the speed at which the metal is melted, the molten metal is squeezed out quickly. Generally, the running speed of the platen during upsetting (i.e., the upsetting speed) is limited by the performance of a welding machine in use. Therefore, if the current density of the current passed is so high that the metal is melted at a speed that exceeds the maximum upsetting speed of the welding machine employed, the molten metal at the abutting surfaces may splash away. If the current density of the current passed is extremely high, the workpieces and electrode may be burned together and other problems happen. Besides, using such a current is practically undesirable because of the need to employ a large-capacity power supply system.

While thus allowing the abutting surfaces to melt, the platen is moved at a mean upsetting rate of not lower than 50 mm/sec. With only the metal being melted squeezed out rapidly, ultimate upsetting is performed with a low pressure of under 5 kg/mm² just as upset current is cut off. The mean upsetting rate as used here means the ratio of the platen displacement resulting from the upsetting accomplished by the time upset current is cut off to the duration of time over which upset current is passed.

Essentially, the mean upsetting rate is restricted by the inertial mass of the moving part of a welding machine. Within the unrestricted limits, raising the upset current density results in increased mean upsetting rate. This brings about a favorable result that the time required for producing a given amount of upset loss or, in other words, squeezing out a given amount of molten metal containing residual oxides and other inclusions is shortened.

With the upset current of said current density passed, the abutting surfaces is melted progressively at a rate of approximately 50 mm/sec. or above. According to the method of this invention, the metal being molten must be squeezed out while keeping the deformation of the base metal to a minimum. If the platen is moved at a mean upsetting rate of under 50 mm/sec., the molten metal may splash away or solidify on the weld after upset current has been cut off. It is known that the solidified metal deteriorates the quality of the weld, especially exercising an adverse effect on toughness.

By thus progressively squeezing out the molten metal in the abutting surfaces, the surface irregularities, oxides and other inclusions that were produced during the flashing process are eliminated to make the abutting surfaces clean and smooth. Then, upset current is cut off while pressing together the abutting surfaces with a force of under 5 kg/mm². The applied force must be under 5 kg/mm² because the distortion of metal flow will result if the force exceeds the compression strength of the steel being welded at high temperatures. If the force is not lower than 5 kg/mm², the distortion of metal flow as shown at (A) in FIG. 3, which may lead to the lowering of toughness, can result. Since the abutting surfaces have been made clean and smooth by the squeeze of molten metal, an intimate contact can be achieved between the abutting surfaces even if the two pieces are pressed together with such a low pressure as approximately 0.5 kg/mm².

The abutting surfaces are made clean by melting the metal thereat by passing a current having a high current density and accomplishing upsetting at a high speed while bringing the two surfaces together with a low pressure so that no distortion of metal flow occurs. The duration of time over which upset current is passed depends upon the width of the abutting surfaces that must be made clean by squeezing out the molten metal therefrom. Experimentally, it was proved that the desired object can be achieved by squeezing out molten metal by an amount of 2 mm in length from each abutting surface, or a total of 4 mm from both abutting surfaces. This means that a satisfactory weld is obtained by passing upset current for a period of approximately 80 msec. using a welding machine that has an upsetting speed of approximately 50 mm/sec.

Figure 3A:
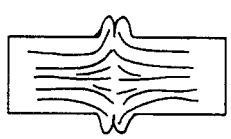
FIGS. 3(A) and (B) are sketches showing macro cross-sections of welds produced under different upsetting conditions; (A) showing a weld produced under the conditions according to a conventional method and (B) showing one under the conditions according to the method of this invention.
Figure 3B:
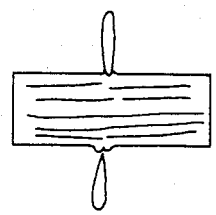

The sketch (B) in FIG. 3 shows a schematic macro cross section of a weld produced by the flash butt welding method of this invention. As may be seen, the weld obtained is sound, defectless and substantially free from metal flow. Such a satisfactory weld may be obtained by employing such means as are described in the following.

One of the conceivable methods is to use a welding machine that performs upsetting at a mean upsetting rate of not lower than 50 mm/sec. while applying a constant upsetting force of under 5 kg/mm². Generally, the moving speed of the platen increases as the upsetting force increases. If the inertial mass and frictional force of the moving part of the welding machine is small enough, it is feasible to attain a mean upsetting speed of not lower than 50 mm/sec. Another method moves the platen during upsetting at a speed equivalent to the speed with which the metal at the abutting surfaces is melted by use of a cam, servo mechanism or other similar means. Just as upsetting current is stopped, an ultimate upsetting force of under 5 kg/mm² is applied. The flash butt welding method according to this invention can be implemented by use of these means.

More elaborate discussion will be made in the following on the effect achieved by the flash butt welding method of this invention, with reference made to an example of implementation. The same steel as that shown in Table 1 before was subjected to flash butt welding, without preheating or other treatment, under the conditions given in Table 3. The ultimate flashing rate V was 1.25 mm/sec. and the temperature To was 20° C. Since the current density derived from the equation $$I = 120\sqrt{\frac{1500 - T_o}{1500}} V$$

was 133 Arms/mm², the current density of the current applied was set to 150 Arms/mm². The frequency of the welding power supply used was 50 Hz.

TABLE 3

| Welding Conditions | |
| --- | --- |
| Total flash loss | 15 mm |
| Flashing time | 24 sec. |
| Ultimate flashing rate V | 1.25 mm/sec. |
| Upset current density | 150 Arms/mm² |
| Upsetting force | 3.0 kg/mm² |

Figure 2:
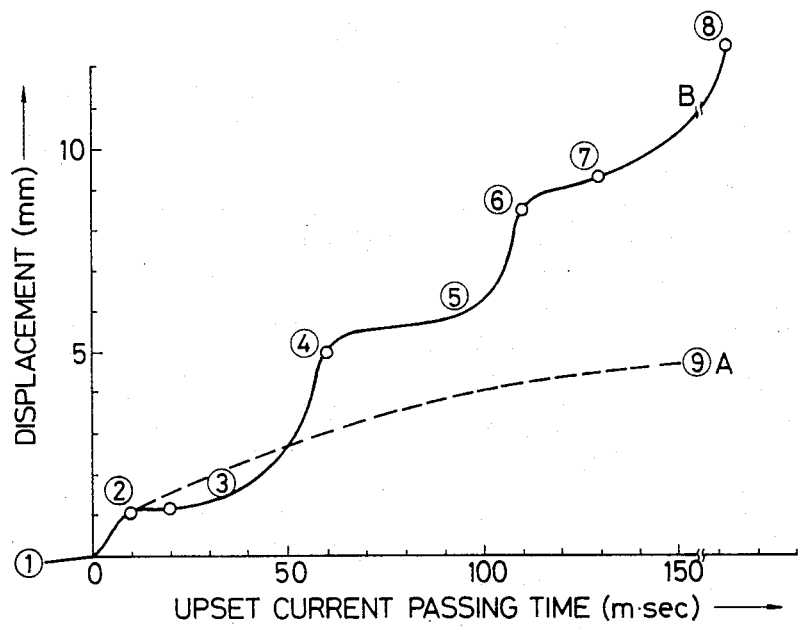
FIG. 2 shows the relationship between the time during which upset current is passed and the amount of upset displacement.

The welding machine employed was of the type that applies a constant pressure pneumatically. The curve (B) in FIG. 2 shows the displacement of the platen during the upsetting process. As may be seen, the position of the platen changes with time as plotted at points ① through ⑧. The displacement between points ② and ③ was moderate since the moving speed of the platen did not reach the speed at which the abutting surfaces were melted because the pressing force or the acceleration of the platen was fixed. With the lapse of time, the moving speed of the platen increased to an extent that the molten metal was fully squeezed out at point ④, thereby bringing the solid portions of the two metal pieces into contact with each other. Since the upsetting force was as low as 3 kg/mm², the platen became incapable of making any further advance and substantially came to a standstill, as indicated by the plotting at points ④, ⑤ and ⑥. The upsetting current was cut off at each of the points ④ through ⑧ for the performance of a notch impact test. The mean upsetting rate at each point was 70 mm/sec.

Figure 4:
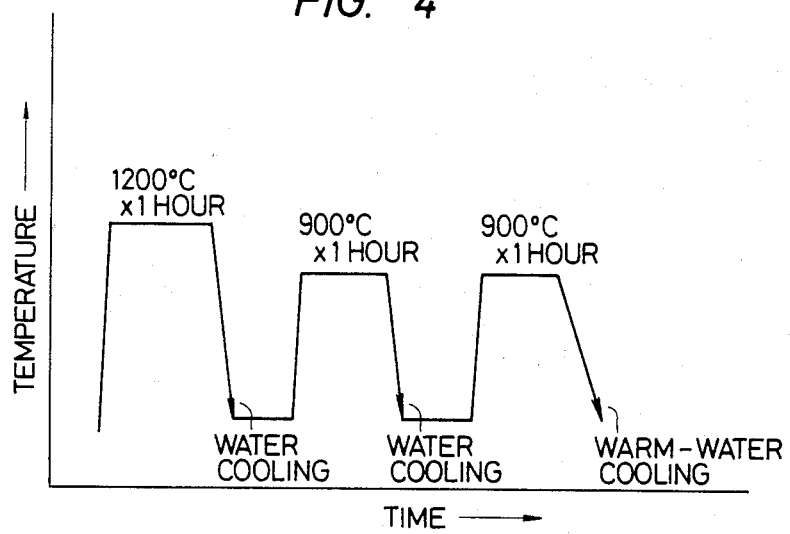
FIG. 4 shows how the weld and base metal are heat treated.
Figure 5:
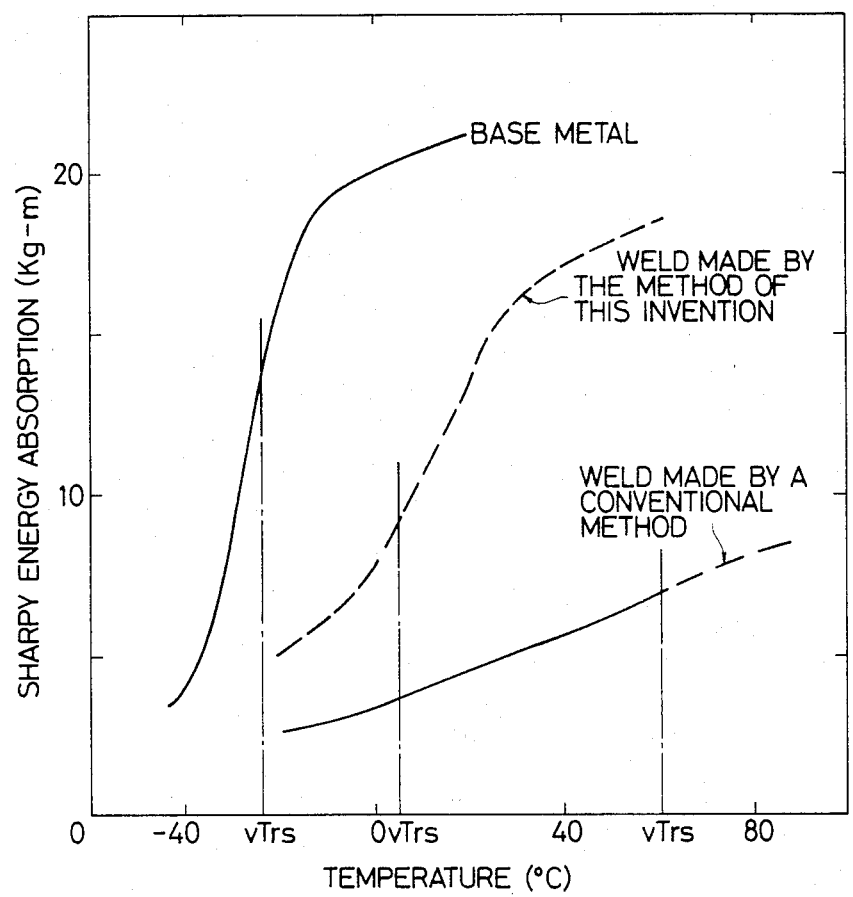
FIG. 5 shows the notch impact toughness value of the base metal and the welds produced by the conventional method and the method of this invention.

Finally, FIG. 5 shows an example of a notch impact test that was applied, following the heat treatment shown in FIG. 4, to the base metal, the weld made under the conventional welding conditions as shown in Table 2, and the weld made by the method of this invention. As may be seen, the weld made by the conventional welding method exhibited a lower impact energy vET whereas the transition temperature vTrs exhibited an appreciable shift toward the high-temperature side as compared with the base metal, although the same heat treatment was applied to both. The weld made by the method according to this invention showed a remarkable improvement, with the vET and vTrs values thereof approaching close to those of the base metal.

As has been discussed, the flash butt welding method according to this invention produces sound, high-quality welds that undergo little deterioration in toughness.

What is claimed is:

1. In a flash butt welding method joining together two pieces of steel and comprising a flashing process and an upsetting process, the improvement which comprises the steps of passing a current having a current density I (A/mm²) that is not lower than $$120 \sqrt{\frac{1500 - T_o}{1500}} \, V$$

(where To is the temperature (°C.) to which the portion near the abutting surfaces is preheated before flashing is started and V (mm/sec.) is the ultimate flashing rate) through the abutting surfaces of the workpieces, achieving upsetting at a mean speed of not lower than 50 mm/sec., and applying an ultimate upsetting force of under 5 kg/mm² when upset current is cut off.

* * * * *